United States Patent

[11] 3,589,149

| [72] | Inventor | Artur Fischer<br>Tumlingen, Kreis Freudenstadt, Germany |
|---|---|---|
| [21] | Appl. No. | 789,883 |
| [22] | Filed | Jan. 8, 1969 |
| [45] | Patented | June 29, 1971 |
| [32] | Priority | Feb. 15, 1965, July 8, 1965 |
| [33] | | Germany |
| [31] | | F 45,245 and F 46,557 |
| | | Continuation-in-part of application Ser. No. 524,337, Feb. 1, 1966, now abandoned. |

[54] DIVIDED HUB
5 Claims, 3 Drawing Figs.

[52] U.S. Cl. .................................................. 301/63 DS,
74/230.4, 301/1, 287/53
[51] Int. Cl. .................................................. B60b 3/08
[50] Field of Search .......................................... 74/230.3,
230.4; 287/52.06, 53; 301/63

[56] References Cited
UNITED STATES PATENTS

| 2,105,317 | 1/1938 | Frank | 301/63 X |
|---|---|---|---|
| 2,566,663 | 9/1951 | Hollerith | 301/63 X |
| 3,321,863 | 5/1967 | Maxam | 74/230.3 UX |
| 3,438,276 | 4/1969 | Fischer | 301/63 X |

*Primary Examiner*—Milton Kaufman
*Attorney*—Michael S. Striker

ABSTRACT: A divided hub for removably supporting annular elements has at least two coaxial hub parts threadedly connectable with one another. A pair of disc portions are each provided on one of the hub parts and define with one another a circumferential groove for receiving and retaining an inner marginal zone of an annular element. Means is provided for aligning the disc portions with one another in radial direction of the hub parts when the latter are threadedly connected with one another.

PATENTED JUN29 1971 3,589,149

INVENTOR
ARTUR FISCHER
BY
ATTORNEY

DIVIDED HUB

CROSS-REFERENCE TO RELATED APPLICATION

This present application is a continuation-in-part of my copending application entitled "divided hub," and filed on Feb. 1, 1966 under Ser. No. 524,337, now U.S. Pat. No. 3,438,276.

BACKGROUND OF THE INVENTION

The present invention relates to a divided hub. More particularly the invention relates to a divided hub which is especially useful in conjunction with mechanical building toys for removably connecting wheels, gears, discs, chains and the like to a shaft.

In my aforementioned copending application I have set forth a divided hub of the general type here under discussion wherein two coaxial hub parts are provided with cooperating screw threads which are threadedly connectable. Each of the hub parts comprises a disc portion of which one is a discrete member turnably mounted on the associated hub part. The disc portions define with one another a circumferential groove adapted to receive and retain an inner marginal zone of an annular element, and means are provided for aligning one of the disc portions in radial direction of the hub parts with reference to the other disc portion.

While this construction as set forth in my copending application is fully operative and highly satisfactory, it does have one disadvantage, namely the fact that the discrete disc portions must be manufactured as a separate member and be assembled with its associated hub part. This brings with it various problems, readily evident to those skilled in the art. It will suffice, therefore, to point out that the manufacture of the discrete disc portion as a separate item requires separate tooling, a separate manufacturing step, an assembling step, and that it involves a question of manufacturing tolerances, rejects resulting from excessive tolerance variations and similar problems.

It is, accordingly, desirable to overcome these disadvantages.

SUMMARY OF THE INVENTION

It is a general object of the present invention to overcome the aforementioned disadvantages.

A more particular object of the invention is to provide a divided hub of the type under discussion wherein it is not necessary for one of the disc portions to be a discrete member.

Still another object of the present invention is to provide such a divided hub which is suitable for the above-outlined purposes and wherein the parts of the divided hub can be readily connected and disconnected from one another.

A concomitant object of the invention is to provide a divided hub wherein the parts of the hub will properly center themselves with respect to one another when the parts are connected with each other.

Still another object of the invention is to provide such a divided hub wherein the hub parts may also be fixedly clamped onto a shaft for rotation therewith and against axial displacement relative thereto.

In pursuance of the above objects, and others which will become apparent hereafter, one feature of my invention resides in the provision of a divided hub capable of removably supporting annular elements and having at least two coaxial hub parts provided with cooperating screw threads and being threadedly connected with each other. A pair of disc portions are each provided on one of the hub parts and define with one another a circumferential groove adapted to receive and retain an inner marginal zone of an annular element. Finally I provide means for aligning the disc portions with one another in radial direction of the hub parts in response to threaded connection of the latter with each other.

Preferably one of the parts is formed with a coaxial conical portion and the other with a corresponding conical cavity in which the conical portion is located. The one part is provided with a coaxial bore extending therethrough and the conical portion thereof, and the conical portion is preferably provided with a plurality of slots extending radially so that when the cooperating screw threads of the two hub parts are engaged and tightened, the slots through the conical portion of the one part will be narrowed whereby a shaft extending through the bore will be tightly clamped in the conical portion of the one part.

Preferably both hub parts are constituted of plastic material and to facilitate proper tightening of the cooperating screw threads at least one of the parts may be in form of a wing nut, or both parts may be provided with radially extending wings on the outer surface thereof. To properly center the two parts with respect to each other, one of the parts is preferably provided with a centering rim engaging in a corresponding cavity in the other part.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
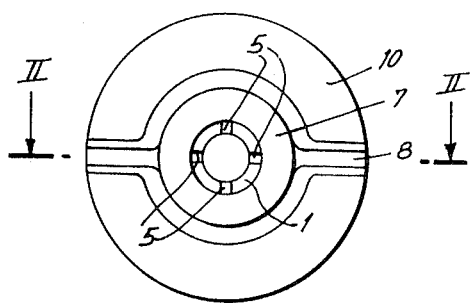
FIG. 1 is a side view of a hub according to the present invention.
Figure 2:
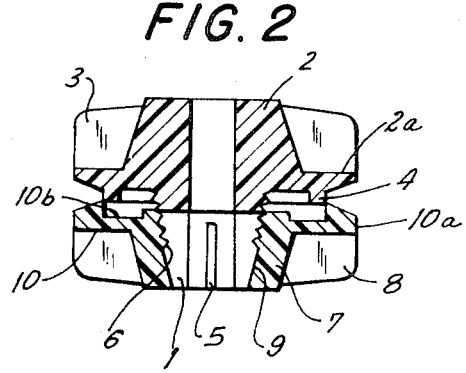
FIG. 2 is a cross section taken on the line II–II of FIG. 1.

Discussing now the drawing in detail, and firstly FIGS. 1 and 2 thereof, it will be seen that the divided hub according to my invention includes two coaxial hub parts respectively identified with reference numerals 2 and 7. Hub part 2 is provided with a disc portion 2a and a coaxial conical portion 1 which projects to one side of the disc portion 2a; a pair of wings 3 respectively project in radial direction and to the other side of the disc portion 2a.

The hub part 7 is provided with a substantially conical coaxial cavity 9 into which the conical portion 1 of the hub part 2 extends, engaging with the outer surface thereof the inner surface of the cavity 9.

At its larger diameter end the conical portion 1 is provided with an outer screw thread 6 and a mating inner screw thread is provided on the hub part 7 so that the hub parts 2 and 7 may be threadedly connected. A central bore is formed in the hub part 2 and extends also through the conical portion 1 thereof. A plurality of slots 5 are formed in the conical portion 1, extending radially outwardly from the bore. It will be appreciated that, when the cooperating screw threads are engaged and tightened and a shaft is located in the bore, the slots 5 will become narrowed so that the inner surface defining and outlining the bore through the conical portion 1 will be tightly pressed against the outer surface of the shaft, thus connecting the hub with the shaft against rotational and axial displacement.

The hub part 7 is provided with a disc portion 10 integral therewith, and more specifically of one piece therewith. Thus, the hub part 7 together with its disc portion 10 may be manufactured in a single manufacturing step, avoiding a separate manufacturing step for the disc portion 10, avoiding the possibility of excessive tolerance variations, avoiding the necessity for assembly of the disc portion 10 with the hub part 7 and decreasing the expenses involved in making this hub part.

That side of the disc portion 10 which faces the portion 2a is provided with an annular zone of reduced thickness, bounded in part by the bottom wall 10b and serving to make disc portion 10 somewhat resiliently deflectable in response to axially directed stresses acting upon disc portion 10 upon relative axial displacement of the hub parts 1 and 2 in a sense threading them together. Disc portion 2a is provided with a similar zone in the embodiment of FIG. 2.

As shown in FIG. 2, the disc portion 10 is preferably provided with an annular enlarged shoulder portion 10a having an annular surface inclined at an acute angle to the axis of the bore through the hub portion 2 and facing an oppositely inclined annular surface provided on the disc portion 2a, so that the two annular surfaces together form a substantially V-shaped groove the width of which may be changed within certain limits by threading the hub parts 2 and 7 into each other to a lesser or greater extent.

An annular centering rim 4 is integrally provided on the hub part 2 and extends into a corresponding cavity formed by the inner surface of the shoulder portion 10a on the disc portion 10.

Preferably, but not necessarily, the hub part 7 will also be provided with a pair of wings, here identified with reference numeral 8 (compare FIG. 2) and extending radially therefrom.

If desired the oppositely inclined surfaces which define with one another the V-shaped groove may be roughened or provided with serrations or analogous means for more positively engaging a part located in this groove.

Figure 3:
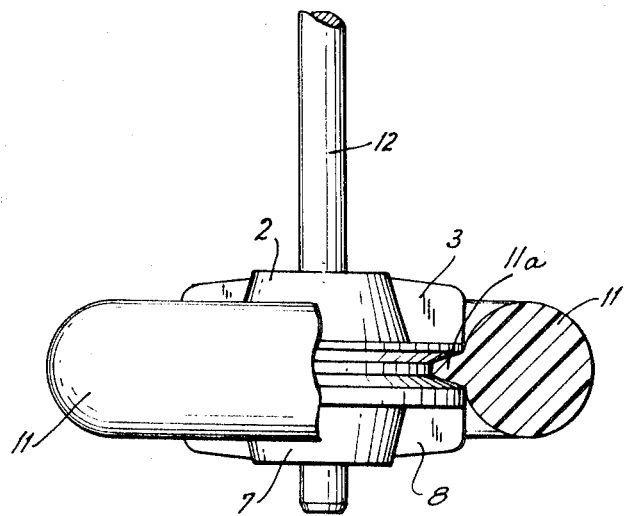
FIG. 3 is a partially sectioned top view of the hub shown in FIGS. 1 and 2 and illustrating the mounting of a rubber wheel on this hub.

Coming, finally, to FIG. 3 it will be seen that in this Figure I have illustrated one possibility of use of my novel hub. In FIG. 3 the hub is illustrated as serving to mount a rubber wheel 11 which, as clearly shown, has an inner rim 11a of trapezoidal cross section which is engaged in the V-shaped groove between the disc portion 2a of hub part 2 and 10 of hub part 7. A shaft 12 extends through the bore in the hub and, depending upon the extent to which the hub parts 2 and 7 are threadedly connected with one another, the shaft 12 may be tightly clamped by engagement with the inner surface surrounding the bore, that is clamped in response to narrowing of the slots 5, or if this is not desired the hub parts 2 and 7 will be threadedly connected to a lesser extent in which case the hub with the connected wheel 11 will be freely rotatable on the shaft 12 with respect to the same.

It will be appreciated that the exemplary instance of use shown in FIG. 3 is only one of many possibilities. A number of other possibilities has been disclosed in detail in my aforementioned copending application to which reference may be had. While the construction of the hub part of the present invention and that of my copending application differ from one another, the possibilities of use are substantially the same in both cases so that the examples shown there hold analogously true in the present instance also.

The various components of my novel divided hub are preferably made from a synthetic plastic material, advantageously a tough material from which they may be made by a molding process.

It will be understood that each of the elements described above, or two or more together, may also find a useful application in other types of divided hubs differing from the types described above.

While the invention has been illustrated and described as embodied in a divided hub, it is not intended to be limited to the details shown, since various modifications and structural changes may be made without departing in any way from the spirit of the present invention.

What I claim as new and desired to be protected by Letters Patent is set forth in the appended claims.

1. A divided hub for removably supporting annular elements, comprising at least two coaxial hub parts provided with cooperating screw threads and being threadedly connected with each other; a pair of disc portions each provided on and integral with one of said hub parts, said disc portions defining with one another a circumferential groove adapted to receive and retain an inner marginal zone of an annular element; means for aligning said disc portions with one another in radial direction of said hub parts in response to threaded connection of said hub parts with each other; and at least one annular zone of reduced thickness provided in at least one said disc portions so that the latter is at least slightly resiliently deflectable in response to axially directed stresses acting upon said one disc portion upon relative axial displacement of said hub parts in a sense threading the same together.

2. A divided hub as defined in claim 1, said means comprising an annular centering rim provided on one of said disc portions, and a corresponding cavity in which said centering rim is received on the other of said disc portions.

3. A divided hub as defined in claim 1, said disc portions having respective annular faces extending from the periphery thereof and being inclined with reference to one another so that said groove is of substantially V-shaped cross-sectional configuration.

4. A divided hub as defined in claim 1, said hub parts each comprising a hub portion coaxial with the respective disc portion, one of said hub portions being conical and the other having a complementary recess into which said one hub portion is inserted and said one hub portion also being resiliently deformable in response to stresses developing upon relative axial displacement of said hub parts in a sense inserting said one hub portion deeper into said recess of the other hub portion.

5. A divided hub as defined in claim 4, wherein said one hub portion is provided with a plurality of slots extending radially therethrough and subdividing it into a plurality of resilient tongues.